(12) United States Patent
Bruin

(10) Patent No.: US 12,576,670 B2
(45) Date of Patent: Mar. 17, 2026

(54) WHEEL COVER MOUNTING ASSEMBLY

(71) Applicant: ZF CV SYSTEMS EUROPE BV, Brussels (BE)

(72) Inventor: James Bruin, Rochester Hills, MI (US)

(73) Assignee: ZF CV SYSTEMS EUROPE BV, Brussels (BE)

( * ) Notice: Subject to any disclaimer, the term of this patent is extended or adjusted under 35 U.S.C. 154(b) by 662 days.

(21) Appl. No.: 17/592,683

(22) Filed: Feb. 4, 2022

(65) Prior Publication Data

US 2023/0249494 A1 Aug. 10, 2023

(51) Int. Cl.
B60B 7/04 (2006.01)
B60B 7/00 (2006.01)
B60B 7/06 (2006.01)
B60B 7/08 (2006.01)

(52) U.S. Cl.
CPC .............. B60B 7/04 (2013.01); B60B 7/0086 (2013.01); B60B 7/068 (2013.01); B60B 7/08 (2013.01); *B60B 2900/1216* (2013.01); *B60B 2900/513* (2013.01)

(58) Field of Classification Search
CPC ......... B60B 7/04; B60B 7/0086; B60B 7/068; B60B 7/08; Y10T 403/7007; F16B 7/20; F16B 21/04
USPC ...................................... 301/37.376; 403/349
See application file for complete search history.

(56) References Cited

U.S. PATENT DOCUMENTS

| | | | | | |
|---|---|---|---|---|---|
| 1,738,893 | A | * | 12/1929 | Grady | .................. F01P 11/0214 |
| | | | | | 220/301 |
| 3,317,247 | A | * | 5/1967 | Lamme | .................... B60B 7/16 |
| | | | | | 70/171 |
| 4,305,180 | A | * | 12/1981 | Schwartz | ................ F16B 21/04 |
| | | | | | 403/349 |
| 4,998,780 | A | * | 3/1991 | Eshler | ....................... B60B 7/04 |
| | | | | | 301/108.4 |
| 5,048,898 | A | * | 9/1991 | Russell | ................... B60B 7/068 |
| | | | | | 411/429 |
| D744,923 | S | | 12/2015 | Polka | |

(Continued)

FOREIGN PATENT DOCUMENTS

| | | | | | |
|---|---|---|---|---|---|
| CN | 2176313 | Y | * | 9/1994 | ............. B62K 15/00 |
| CN | 221096945 | U | * | 6/2024 | ............. F04D 29/28 |

(Continued)

OTHER PUBLICATIONS

Machine assisted English translation of EP1319526A2 obtained from https://patents.google.com/ on Feb. 3, 2022, 8 pages.

(Continued)

*Primary Examiner* — S. Joseph Morano
*Assistant Examiner* — Eva L Comino
(74) *Attorney, Agent, or Firm* — WARNER NORCROSS + JUDD LLP

(57) ABSTRACT

A wheel cover assembly for a vehicle wheel is provided. The wheel cover assembly includes a mounting apparatus and a wheel cover. The mounting apparatus is adapted for mounting on lug nuts of a vehicle wheel. The mounting apparatus is adjustable in both axial and radial directions. Dual quick release connections releasably connect the wheel cover to the mounting apparatus. The wheel cover may include a plurality of ventilation openings, and a plurality of radially extending fan blades may be disposed on an inner surface of the wheel cover.

12 Claims, 17 Drawing Sheets

(56) References Cited

U.S. PATENT DOCUMENTS

| | | | | |
|---|---|---|---|---|
| D752,494 | S | 3/2016 | Polka | |
| 9,365,074 | B2 | 6/2016 | Polka | |
| 10,300,739 | B1 * | 5/2019 | Saied | B60B 7/0086 |
| 11,207,915 | B1 * | 12/2021 | Mavrofrides | B60B 7/065 |
| 12,077,016 | B2 * | 9/2024 | Polka | B60B 7/02 |
| 2003/0051545 | A1 | 3/2003 | Wallach | |
| 2005/0062336 | A1 * | 3/2005 | Rutterman | B60B 7/20 |
| | | | | 301/37.371 |
| 2005/0062339 | A1 * | 3/2005 | Fitzgerald | B60B 7/20 |
| | | | | 301/108.1 |
| 2010/0270853 | A1 * | 10/2010 | Smith | B60B 7/04 |
| | | | | 301/37.26 |
| 2011/0089748 | A1 * | 4/2011 | Grill | B60B 11/02 |
| | | | | 301/37.102 |
| 2014/0284994 | A1 | 9/2014 | Polka | |
| 2016/0221388 | A1 | 8/2016 | Van Oort et al. | |
| 2018/0370580 | A1 | 12/2018 | Butler et al. | |
| 2019/0270335 | A1 * | 9/2019 | Butler | B60B 7/066 |

FOREIGN PATENT DOCUMENTS

| | | | | |
|---|---|---|---|---|
| DE | 69922881 T2 * | 12/2005 | | B60B 19/10 |
| EP | 1319526 A2 * | 6/2003 | | B60B 19/10 |
| EP | 3153327 A1 | 4/2017 | | |
| EP | 3414110 B1 | 3/2020 | | |
| FR | 2862907 A1 * | 6/2005 | | B60B 19/10 |
| GB | 2065759 A * | 7/1981 | | F16B 21/04 |
| JP | H0722801 U * | 4/1995 | | B60B 7/06 |
| JP | 7538220 B2 * | 8/2024 | | B60B 7/04 |
| WO | WO-2015092206 A1 * | 6/2015 | | F23R 3/283 |
| WO | WO-2020222012 A1 * | 11/2020 | | B60B 7/0006 |

OTHER PUBLICATIONS

Machine assisted English translation of EP3153327A1 obtained from https://patents.google.com/ on Feb. 3, 2022, 13 pages.
Machine assisted English translation of EP3414110B1 obtained from https://patents.google.com/ on Feb. 3, 2022, 11 pages.

* cited by examiner

114

214

WHEEL COVER MOUNTING ASSEMBLY

FIELD OF THE INVENTION

The disclosure generally relates to wheel covers and, more specifically, to mounting systems for aerodynamic vehicle wheel covers providing drag reduction and cooling for improved braking performance.

BACKGROUND OF THE INVENTION

Drag forces caused by air flowing past the wheels of commercial truck and trailer vehicles leads to increased fuel consumption. Also, excessive heat generated from braking events in commercial vehicles causes premature brake fade, decreasing brake performance. Aerodynamic wheel covers provide improved air flow past vehicle wheels. Wheel covers are commonly used in truck and trailer applications to reduce drag and thereby improve fuel economy. Wheel covers typically may be mounted on or about the vehicle wheel hub. However, many conventional wheel cover mounts interfere with other systems located at the hub end such as an ATIS, TPMS, or hub odometer. Additionally, some wheel cover mounts will not fit all types and sizes of commercial vehicle wheels. Further, some wheel covers may trap heat in the wheel hub cavity and may not sufficiently remove heat from the wheel hub cavity. Excess heat can lead to decreased brake performance and increased brake wear (e.g. decreased brake pad life).

BRIEF SUMMARY

An improved wheel cover mounting assembly for universally mounting an aerodynamic wheel cover on commercial vehicle wheels without interfering with other wheel hub end systems is provided. The improved wheel cover mounting assembly also ventilates the wheel hub cavity, thereby cooling the wheel hub cavity and improving braking performance. The wheel cover assembly includes a mounting apparatus adapted for mounting on lug nuts of a vehicle wheel. The mounting apparatus is adjustable in both axial and radial directions. A wheel cover is releasably connected to the mounting apparatus.

In specific embodiments, the mounting apparatus includes a connector body, a pair of bracket wings extending in opposite directions from the connector body, a pair of legs adjustably connected to the pair of brackets, and a foot disposed at an end of each leg. The legs are moveable along the brackets in the radial direction to vary a distance between the legs. Each leg includes telescoping members for adjusting a length of the legs in the axial direction. Each foot is mateable with the lug nuts of the vehicle wheel. The vehicle wheel may be one or more of a non-steer wheel and a drive wheel.

In particular embodiments, each bracket includes an elongated slot and a fastener disposed in the slot for releasably fixing the position of the leg in the bracket.

In particular embodiments, the telescoping members of each leg include an inner member and an outer member, and the inner member is linearly adjustable relative to the outer member.

In specific embodiments, the outer member includes a longitudinal slot, and at least one fastener is disposed in the slot for releasably fixing the position of the inner member relative to the outer member.

In particular embodiments, each foot includes a socket co-operable with one of the lug nuts for connecting the mounting apparatus to the vehicle wheel.

In particular embodiments, the wheel cover assembly includes dual quick release connections that releasably connect the wheel cover to the mounting apparatus.

In certain embodiments, one of the quick release connections includes at least one alignment tab extending from the connector body, and at least one arcuate-shaped twist-lock slot in the wheel cover. Each alignment tab is receivable in one of the twist-lock slots, and twisting of wheel cover locks and unlocks the alignment tab in the twist-lock slot.

In certain embodiments, each twist-lock slot includes an unlocking portion and an adjacent locking portion. The alignment tab fits through the unlocking portion but is not passable through the locking portion. The locking portion includes a nest that receives and holds the alignment tab.

In certain embodiments, one of the quick release connections includes a bayonet connector that releasably connects the mounting apparatus to the wheel cover.

In certain embodiments, the bayonet connector includes at least one radially extending pin disposed on a back side surface of the wheel cover, at least one female receptor disposed on the connector body of the mounting apparatus, and a spring-loaded plunger urging the wheel cover away from the connector body when the wheel cover is connected to the mounting apparatus. Each female receptor receives one of the radially extending pins. The plunger thereby releasably secures the at least one pin in the at least one female receptor.

In certain embodiments, the female receptor has a spiral-like shape including an inlet running in the axial direction, an intermediate channel connected to and generally perpendicular to the inlet, and a docking portion connected to and generally parallel to the inlet. The pin is held in the docking portion in a locked orientation.

In specific embodiments, the wheel cover includes a plurality of inlet and exhaust opening. The exhaust openings are circumferentially spaced along an outer edge of the wheel cover. The inlet openings are concentric with the exhaust openings and disposed closer to a center of the wheel cover than the exhaust openings.

In particular embodiments, an outer surface of the wheel cover includes a convex ring adjacent the outer edge, and a recessed center portion within the convex ring. The plurality of inlet openings are disposed along a peripheral edge of the recessed center portion.

In particular embodiments, the wheel cover includes a concave inner surface, and a plurality of radially extending fan blades disposed on the concave inner surface.

In certain embodiments, the fan blades form a centrifugal radial fan that draws air through the ventilation openings.

A method of mounting a wheel cover on a vehicle wheel is also provided. The method includes adjusting the mounting apparatus in the radial direction to ensure proper fit of the mounting apparatus on the lug nuts securing the vehicle wheel to an axle hub of the vehicle. The method further includes adjusting the mounting apparatus in the axial direction to avoid any components attached to or part of the axle hub. The method further includes releasably connecting the wheel cover to the mounting apparatus to cover an axial cavity of the wheel, thereby aiding in aerodynamic drag reduction and expulsion of stagnant air from the wheel end adjacent the hub.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

A wheel cover assembly is provided. Referring to FIGS. 1-10 and 15-17, wherein like numerals indicate corresponding parts throughout the several views, the wheel cover assembly is illustrated and generally designated at 10. Certain features of the wheel cover assembly 10 are functional, but can be implemented in different aesthetic configurations.

The wheel cover assembly 10 includes a mounting apparatus 12 adapted for mounting on lug nuts of a vehicle wheel and a wheel cover 14 releasably connected to the mounting apparatus. The mounting apparatus 10 is adjustable in both axial and radial directions.

Figure 1:
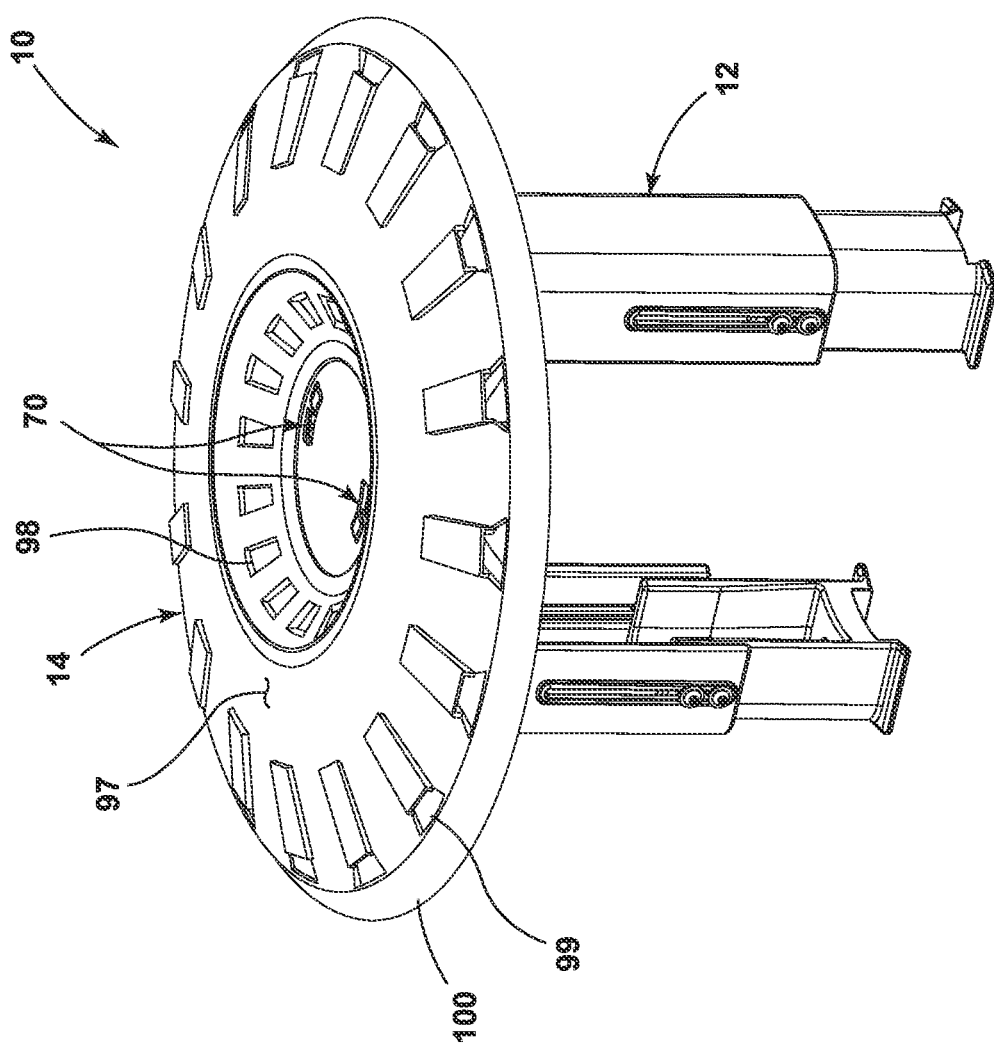
FIG. 1 is a front perspective view of a wheel cover mounting assembly including a mounting apparatus and wheel cover in accordance with some embodiments of the disclosure.
Figure 2:
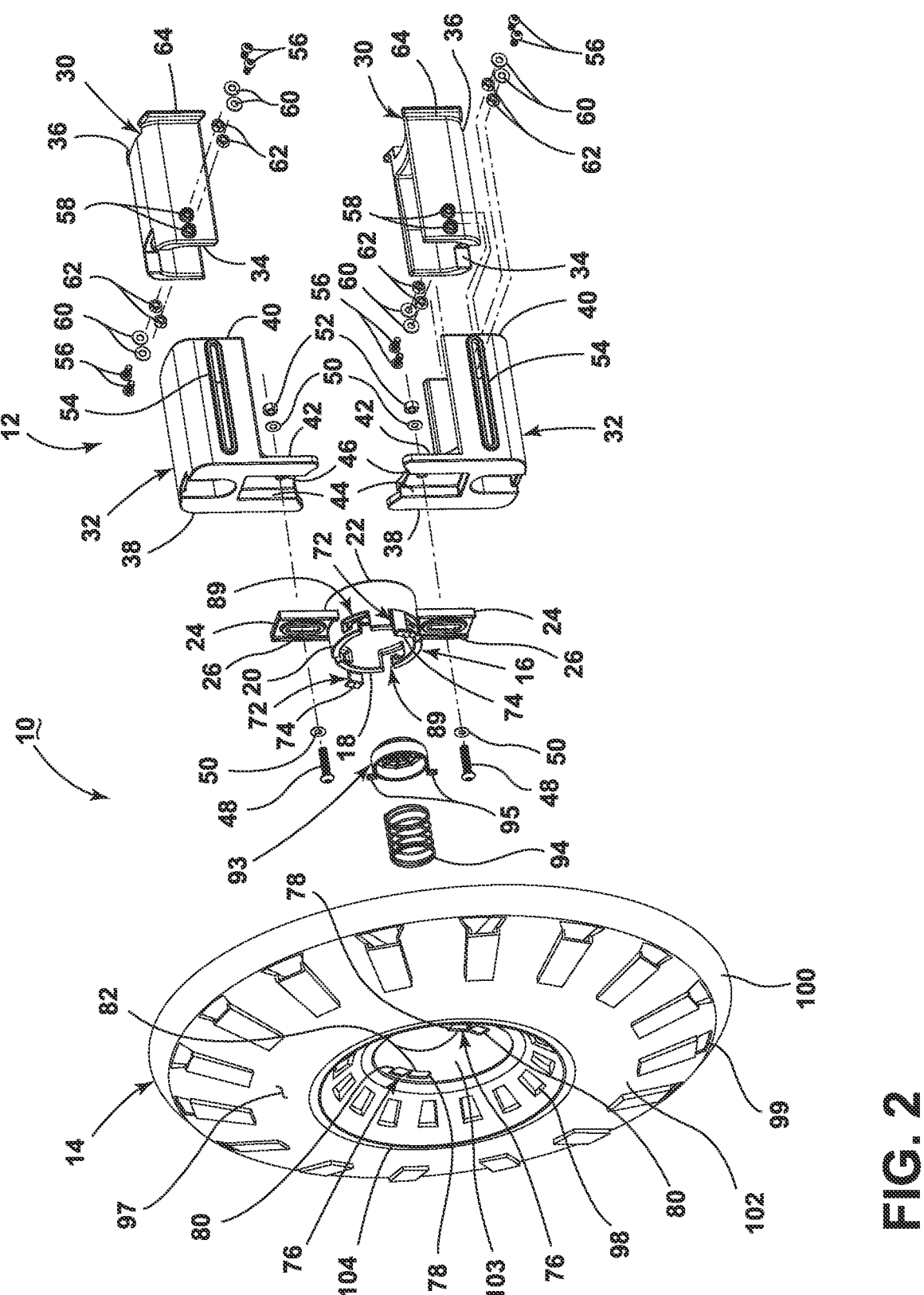
FIG. 2 is an exploded view of the wheel cover mounting assembly of FIG. 1.
Figure 3:
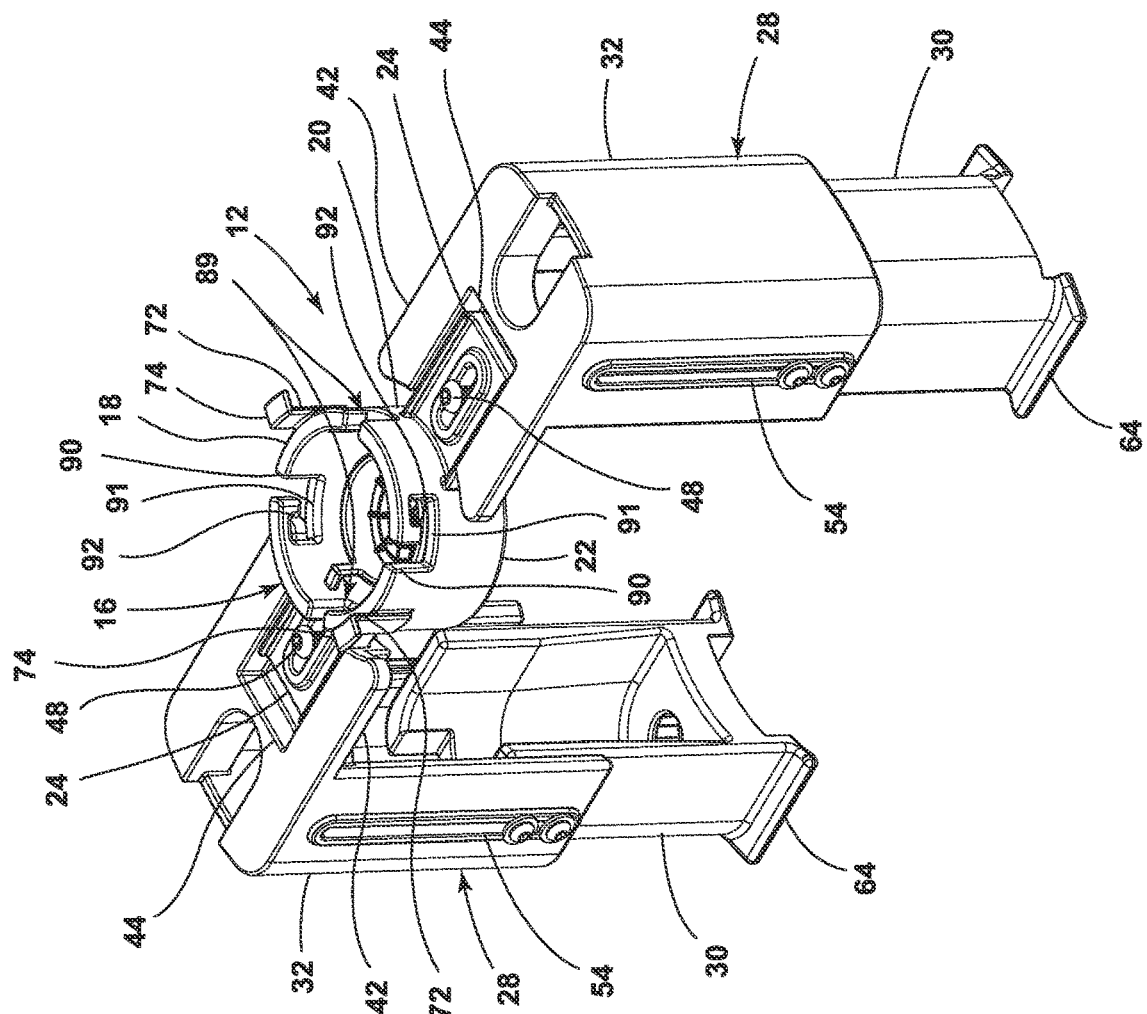
FIG. 3 is a front perspective view of the mounting apparatus of the assembly in accordance with some embodiments of the disclosure.
Figure 4:
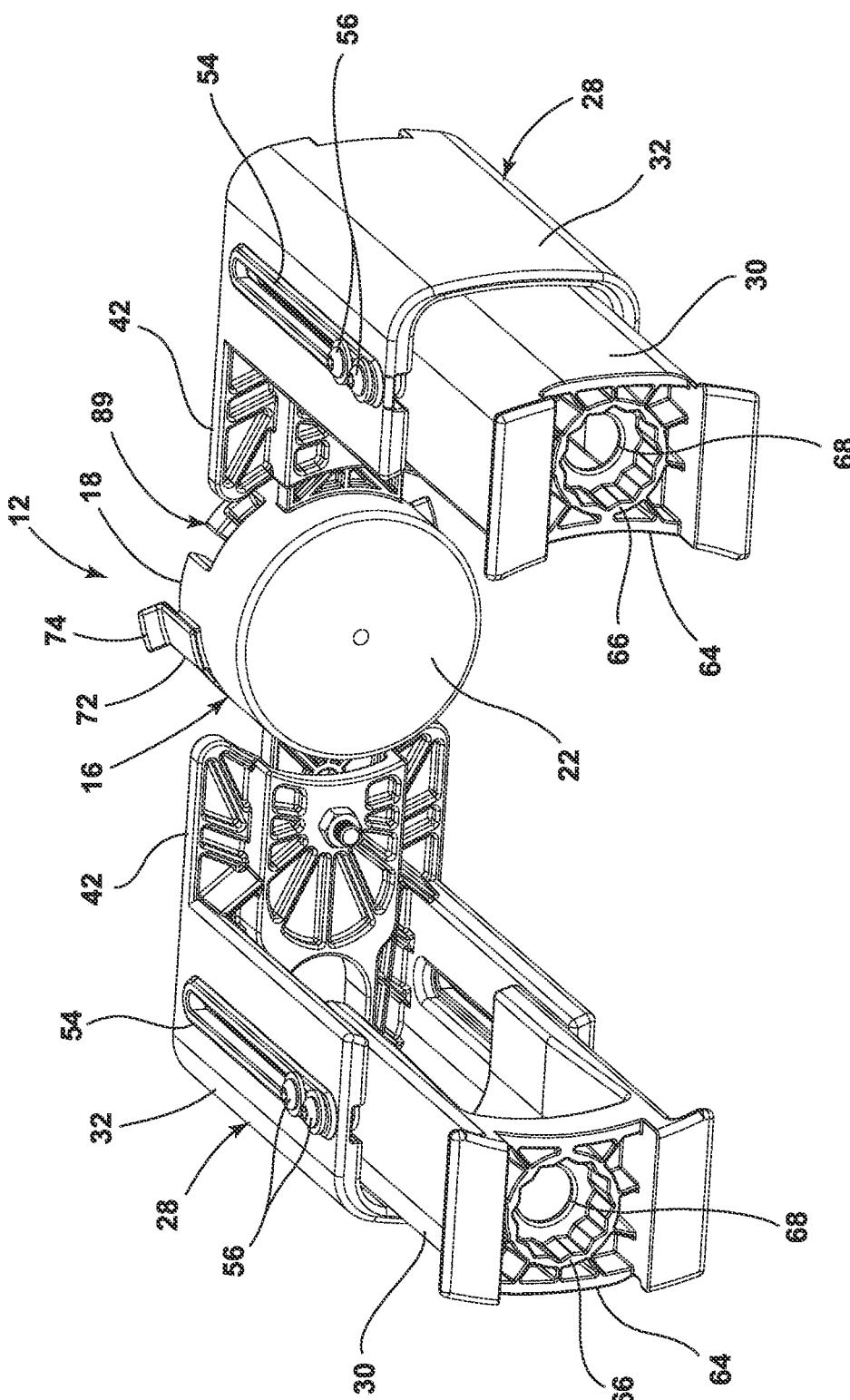
FIG. 4 is a rear perspective view of the mounting apparatus of FIG. 3.

As shown in FIGS. 2-4, the mounting apparatus 12 includes a generally hollow, cylindrical connector body 16 that is open at one end 18. The connector body 16 is defined by a sidewall 20 and closed end surface 22. Two essentially identical bracket wings 24 extend radially from the sidewall 20 in generally opposite directions (180° degrees apart in an angular direction along the circumference of the connector body), thereby being generally symmetrical disposed in relation to the body. The bracket wings 24 are near the closed, bottom end of the connector body. An elongated slot 26 is formed in each of the brackets 24. The slots 26 allow for adjustable attachment of the connector body 16 to a pair of mounting legs 28.

Each leg 28 includes telescoping inner and outer members 30, 32 that extend in an axial direction with respect to the connector body 16. The inner member 30 has first and second ends 34, 36, and the outer member 32 has first and second ends 38, 40. The inner and outer members 30, 32 may each have a generally U-shaped cross-section. The first end 38 of the outer member 32 includes a flange 42 having a recess 44 that receives one of the brackets 24, and a through hole 46 is located in the recess. A fastener 48 such as a bolt, screw, or similar connects the bracket 24 to the leg 28. For example, a bolt-type fastener 48 may extend through the slot 26 in the bracket and the through hole 46 in the leg 28, and may be secured with washers 50 and/or a nut 52. The leg 28 adjustably slides along the bracket 24, thereby moving the leg in the radial direction toward or away from the connector body 16. As described in more detail below, loosening the nut 52 allows the leg 28 to be moved relative to the connector body 16, as the bolt 48 slides within the bracket slot 26. Movement of the leg 28 is limited by the slot 26 such that the distance the leg may travel in the radial direction is no greater than the length of the slot. The width of the slot 26 also may be approximately equal to or slightly larger than the diameter of the shaft of the bolt 48 such that the bolt only travels in the lengthwise direction of the slot. Tightening of the nut 52 on the bolt 48 in the slot 26 fixes the position of the leg 28 on the bracket 24.

The second end 40 of the outer member 32 has an opening sized to receive the first end 34 of the inner member 30. The outer member 32 of the leg 28 further includes an elongated slot 54 formed in a side wall of the outer member. In certain embodiments, the outer member 32 may include two elongated slots 54, the slots being formed on opposite side walls of the outer member and optionally being symmetrically disposed on the outer member. One or more fasteners 56 such as a bolt, screw, or similar connects the inner member 30 to the outer member 32. For example, bolt-type fasteners 56 may extend through the slot 54 in the outer member 32 and circular holes 58 in the inner member 30, and may be secured with washers 60 and/or a tapered heat-set insert 62. The inner member 30 adjustably slides along the outer member 32 thereby moving in and out of the opening at the second end 40 to shorten or extend the length of the leg 28 in the axial direction. As described in more detail below, loosening the fasteners 56 allows the inner member 30 to be moved linearly relative to the outer member 32, as the fasteners 56 (and/or a surface feature about the holes 58) slides within the slot 54 in the outer member. Movement of the inner member 30 is limited by the slot 54 such that the distance the inner member may travel in the axial direction is no greater than the length of the slot. The width of the slot 54 also may be approximately equal to or slightly larger than the diameter of the shaft of the bolt 56 (or the diameter of the surface feature around the circular holes 58) such that the bolt only travels in the lengthwise direction of the slot. Tightening of the bolts 56 in the slot 54 fixes the position of the inner member 30 relative to the outer member 32, thus fixing a length of the leg 28.

A foot 64 is disposed at the second end 36 of each inner member 30. Each foot 64 includes a mating feature that allows for coupling of the legs with lug nuts on a vehicle wheel. The mating feature may be a socket 66 such as a 12-point socket, a 6-point socket, or similar that is co-operable with the lug nuts that secure the vehicle wheel to studs on the wheel hub of the vehicle. Mating of the socket 66 with a lug nut connects the mounting apparatus 12 to the vehicle wheel. Each socket 66 may include a circular opening 68 through which an exposed threaded end of the stud may extend when the socket is mated with the lug nut. A jam nut (not shown) may be threaded on the exposed threads of the portion of the wheel stud that extends through the opening 68.

As shown particularly in FIGS. 2, 3, and 5-8D, the wheel cover assembly 10 includes dual quick release connections that releasably connect the wheel cover 14 to the mounting apparatus 12. One of the quick release connections is a two-prong twist and lock mechanism 70. This mechanism 70 includes at least one, preferably two, alignment tabs 72 that extend in the axial direction outwardly from the open end 18 of the connector body 16. The alignment tabs 72 may be disposed approximately 180° apart from each other in the angular direction around the circumference of the connector body 16. However, symmetrical spacing of the tabs is not necessarily required, so long as the position of the tabs in the angular direction matches a cooperating feature on the wheel cover as described below. Also, the tabs 72 may or may not be equidistant from the brackets 24 in the angular direction, i.e. the tabs may or may not be disposed 90° from both brackets. Each tab 72 terminates in an end 74 that is bent in at an approximately 90° angle. The wheel cover 14 includes an arcuate-shaped twist-lock slot 76 for each alignment tab 72. The twist-lock slots 76 are positioned at the same radial and angular positions about a center of the wheel cover 14 as the alignment tabs are positioned relative to the center of the connector body 16. The alignment tabs 72 are therefore insertable into the twist-lock slots 76, and insertion of the tabs 72 into the slots 76 ensures that the wheel cover is properly centered on the connector body 16 of the mounting apparatus 12 (and therefore centered on the wheel) while also aligning the second quick release connection as described in more detail below. Each twist-lock slot 76 includes an unlocking portion 78 and an adjacent locking portion 80. The alignment tabs 72 are received into the twist-lock slots 76 by fitting through the unlocking portions 78. The alignment tabs 72 can be moved into the locking portions 80 by twisting the wheel cover 14. However, the bent ends 74 of the alignment tabs 72 are not passable through the locking portion 80 in the axial direction. Instead, the locking portions 80 each include a nest 82 that receive and hold the alignment tabs 72 to lock the tabs in place when the wheel cover 14 is pulled in the axial direction away from the connector body 16. The alignment tabs 72 are subsequently unlocked by pressing the wheel cover 14 in the axial direction towards the connector body 16, and twisting the wheel cover to move the tabs from the locking portion 80 to the unlocking portion 78.

The other quick release connection is a bayonet-type connector (bayonet connector 84). The bayonet connector 84 includes at least one, preferably two or more, more preferably four, radially extending pins 85 disposed on a back side surface 86 of the wheel cover 14. For example, the back side 86 of the wheel cover may include a cylindrical tube 87 that projects outwardly from the back side in the axial direction. The pins 85 may be generally evenly spaced around the circumference of the cylindrical tube 87 and may be equidistant from the outer edge 88 of the cylindrical tube. The cylindrical tube 87 is sized so that it fits into the open end 18 of the connector body 16 of the mounting apparatus 12. The connector body 16 correspondingly includes a female receptor 89 for each pin 85, each female receptor receiving one of the pins. The female receptors 89 are disposed along the edge of the open end 18 of the connector body 16, and are spaced along the circumference of the open end in the same manner as the pins 85 so that the pins and female receptors may be cooperatively aligned. Each female receptor 89 has a spiral-like shape and includes an inlet 90 running in the axial direction, the inlet being open at the edge of the connector body end 18, an intermediate channel 91 connected to and generally perpendicular to the inlet 90, and a docking portion 92 connected to and generally parallel to the inlet, the docking portion 92 extending back toward the edge of the connector body end 18 but not being open to the edge. Each pin 85 may enter the female receptor 89 at the inlet 90, may travel through the inlet and across the inter-mediate channel 91 and into the docking portion 92. The bayonet connector 84 further includes a spring-loaded plunger 93 that locks the pins 85 in the female receptors 89. The plunger 93 is disposed within the cylindrical tube 87, and a resilient member 94 such as a coil spring or similar is positioned inside the plunger and the cylindrical tube to urge the plunger away from the back side 86 of the wheel cover 14 in the axial direction. The plunger 93 may include one or more prongs 95, and the prongs may fit within slots 96 in the cylindrical tube 87. The slots 96 limit the axial movement of the plunger 93 by restricting the travel of the prongs 95.

When the wheel cover 14 is connected to the mounting apparatus 12 by aligning the alignment tabs 72 with the twist-lock slots 76 and pressing the plunger 93 into the open end 18 of the connector body 16, the pins 85 are received into the inlets 90 of the female receptors 89. While pressing the wheel cover 14 in the axial direction towards the connector body 16, the wheel cover is twisted, thereby moving the pins 85 through the intermediate channels 91 of the female receptors and into the docking portions 92. Releasing the pressing force on the wheel cover 14 allows the plunger 93 to urge the wheel cover away from the connector body 16 and releasably secures the pins 85 in the docking portion 92 of the female receptors 89, the pins being held in the docking portion in this locked orientation. The pins 85 are subsequently unlocked by pressing the wheel cover 14 in the axial direction towards the connector body 16, and twisting the wheel cover to move the pins from the docking portion 92 to the inlet 90, and releasing the pressing force on the wheel cover to allow the pins to be urged out of the female receptors 89.

As one can appreciate from the above description, the disposition of the alignment tabs 72 and female receptors 89 on the connector body 16 of the mounting apparatus 12 match the positioning of the twist-lock slots 76 and pins 85 on the wheel cover 14, thereby these dual locking features simultaneously and cooperatively orient and lock the wheel cover on the mounting apparatus.

In some embodiments as shown in FIGS. 1, 2, 6, 9, and 10, the wheel cover 14 may be disk-shaped, saucer-shaped, or similar having an inner, back-side surface 86 as discussed above and an outer, front-facing surface 97. The disk or saucer-shaped wheel cover 14 may include a plurality of ventilation openings that are divided into a plurality of inlet openings 98 and a plurality of exhaust openings 99. The exhaust openings 99 are circumferentially spaced along an outer edge 100 of the wheel cover 14, and the inlet openings 98 are concentric with the exhaust openings and are disposed closer to a center of the wheel cover 14 than the exhaust openings. The outer surface 97 of the wheel cover 14 may be defined in part by a convex ring 102 that is adjacent the outer edge 100, and a recessed center portion 103 within the convex ring. The inlet openings 98 are disposed along a peripheral edge 104 of the recessed center portion 103 at the transition between the recessed center portion and the convex ring 102. The peripheral edge 104 may be sloped as the recessed portion transitions to the convex ring 102, and the inlet openings 98 may be disposed on this sloped surface.

The inner surface 86 of the wheel cover 14 may include a concave portion 105 opposite the convex ring 102 on the outer surface 97. A plurality of radially extending fan blades 106 may be disposed on the concave inner surface 105. The fan blades 106 may generally extend from the cylindrical tube 87 to the outer edge 100. The fan blades 106 may form a centrifugal radial fan that draws air through the ventilation openings 98, 99. Specifically, in certain embodiments, as the wheel cover spins during use, cool air is drawn through the inlet openings 98 and into the cavity between the inner surface 86 of the cover 14 and the vehicle wheel 107. At the same time, hot, stagnant air (generated, for example, by the brake assembly on the inner side of the wheel) is extracted through the wheel cavity and blown out of the exhaust openings 99 at the outer edge 100 of the cover 14. The flow rate of the air through the wheel cover 14, and hence the heat extraction rate, increases as vehicle speed increases, because the fan blade RPM increases as the wheels turn faster.

Figure 11:
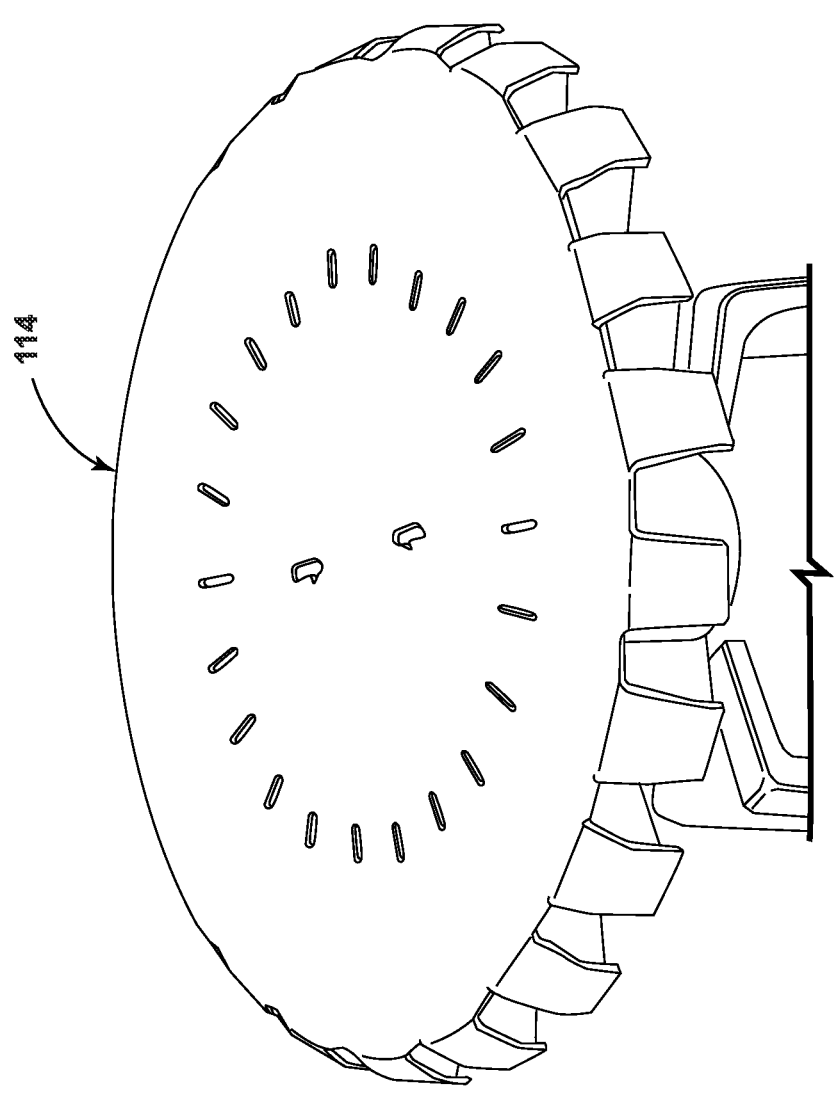
FIG. 11 is a front perspective view of a wheel cover in accordance with certain other embodiments of the disclosure.
Figure 12:
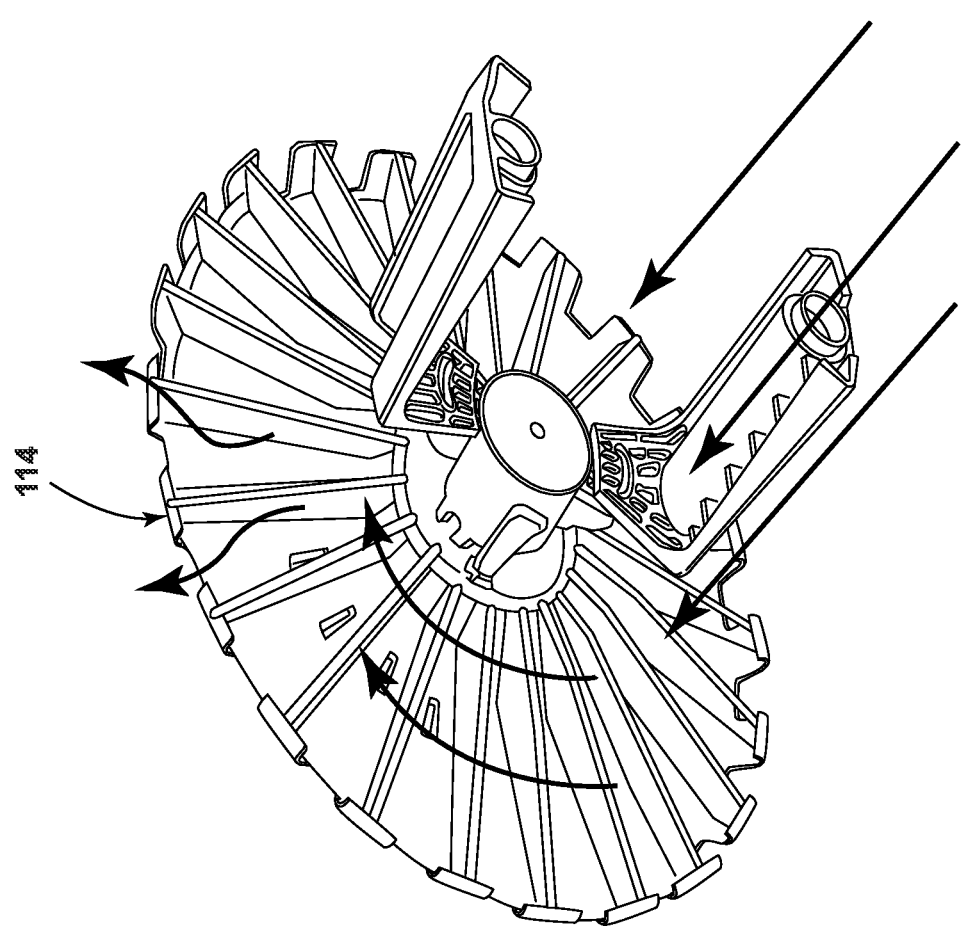
FIG. 12 is a rear perspective view of the wheel cover of FIG. 11.

In certain other embodiments as shown in FIGS. 11 and 12, the wheel cover 114 may have a generally planar surface terminating in an outer edge/ring that is bent out of the plane and towards the inner surface side of the wheel cover. The inlet openings are circumferentially disposed on the planar inner surface and spaced from the outer edge, while the exhaust openings are disposed in the bent outer edge. A plurality of fan blades are disposed on the back side surface of the wheel cover, extending from the cylindrical tube at the center of the wheel to the inside surface of the bent outer edge.

Figure 13:
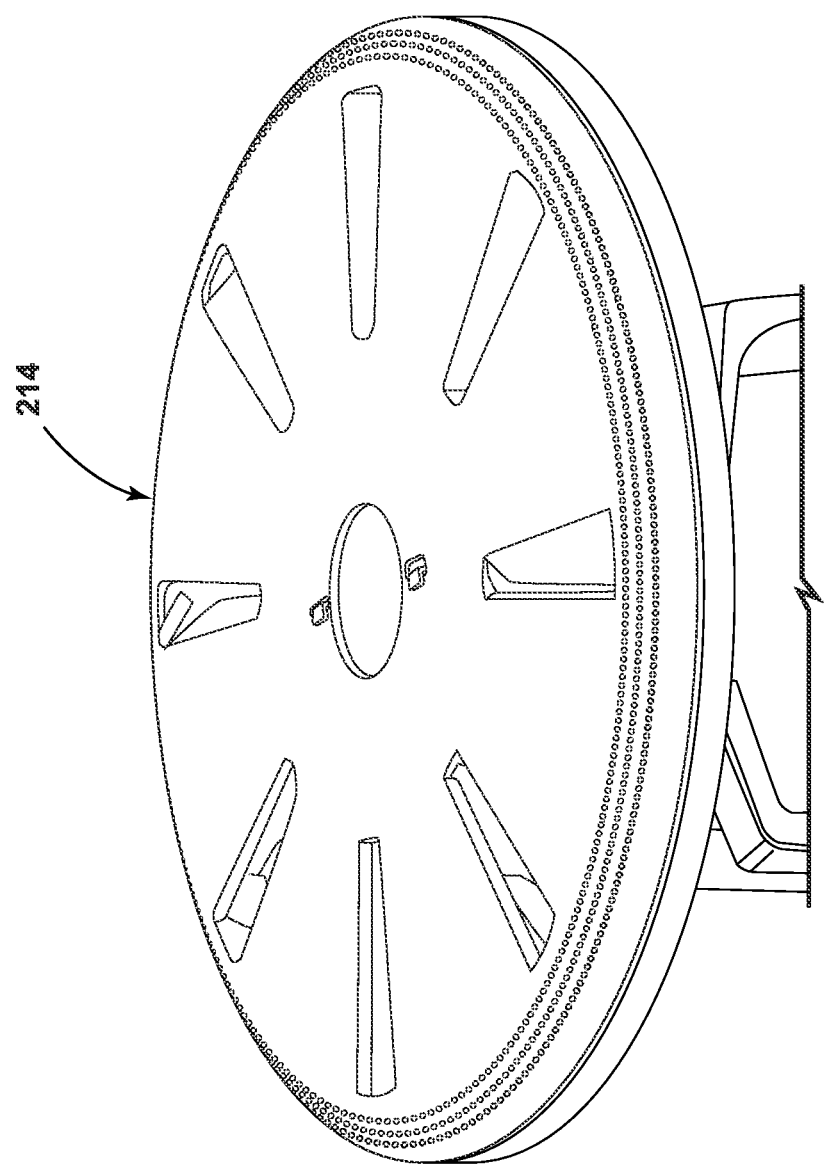
FIG. 13 is a front perspective view of a wheel cover in accordance with certain other embodiments of the disclosure.
Figure 14:
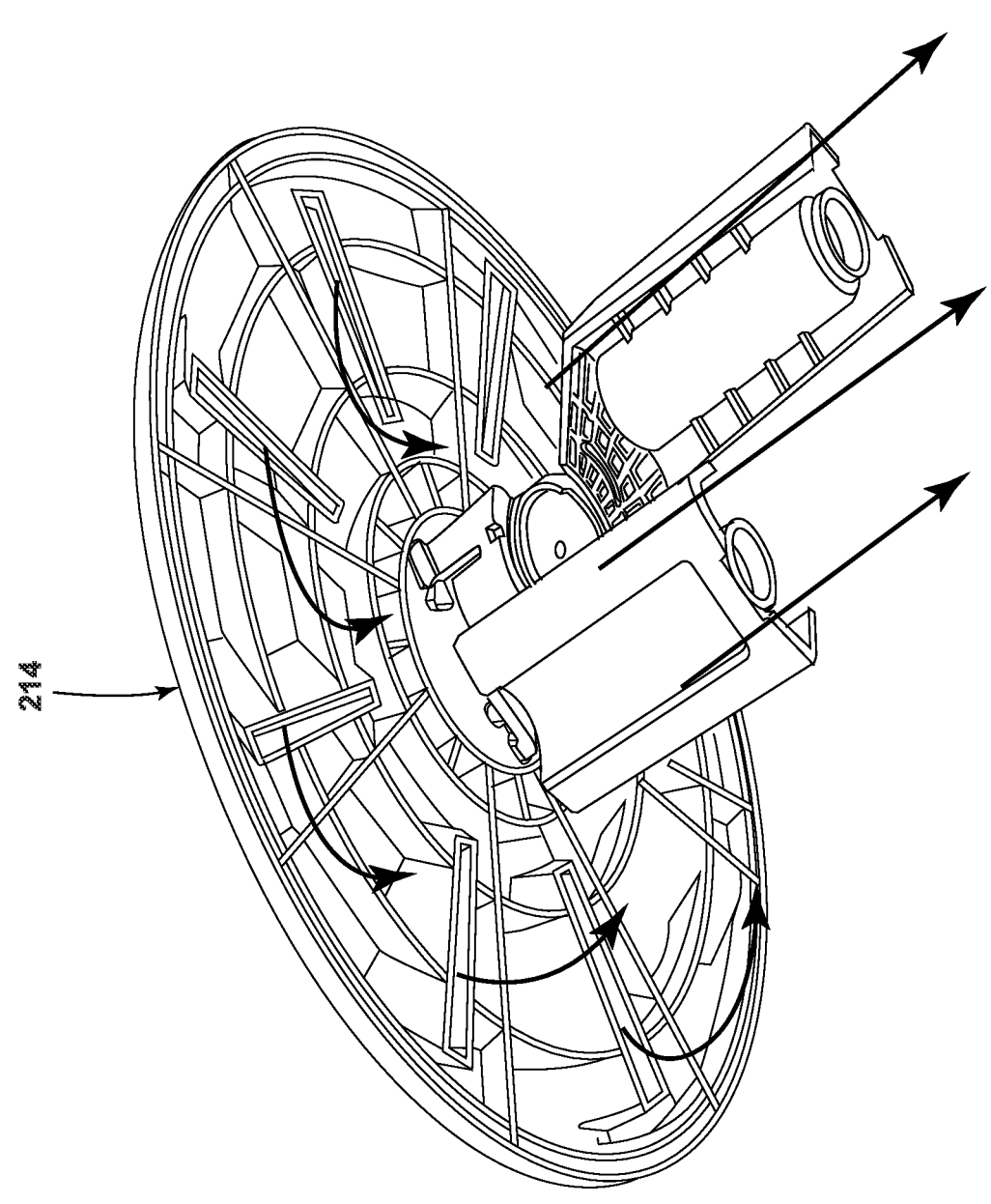
FIG. 14 is a rear perspective view of the wheel cover of FIG. 13.

In certain other embodiments as shown in FIGS. 13 and 14, the wheel cover 214 may alternatively have a single set of ventilation openings that are inlet ducts that draw air to the inner side of the wheel cover and during use force air onto the vehicle wheel and brake assembly to promote cooling. The openings of the inlet ducts may be elongated slots, and the openings may be disposed along the outer edge of the cover. In this embodiment, the outer edge of the wheel cover may also have a textured surface including, for example, dimples that reduce drag forces and help maintain attachment of air to the wheel cover outer surface to maximize the amount of air available to the inlet ducts.

Figure 15:
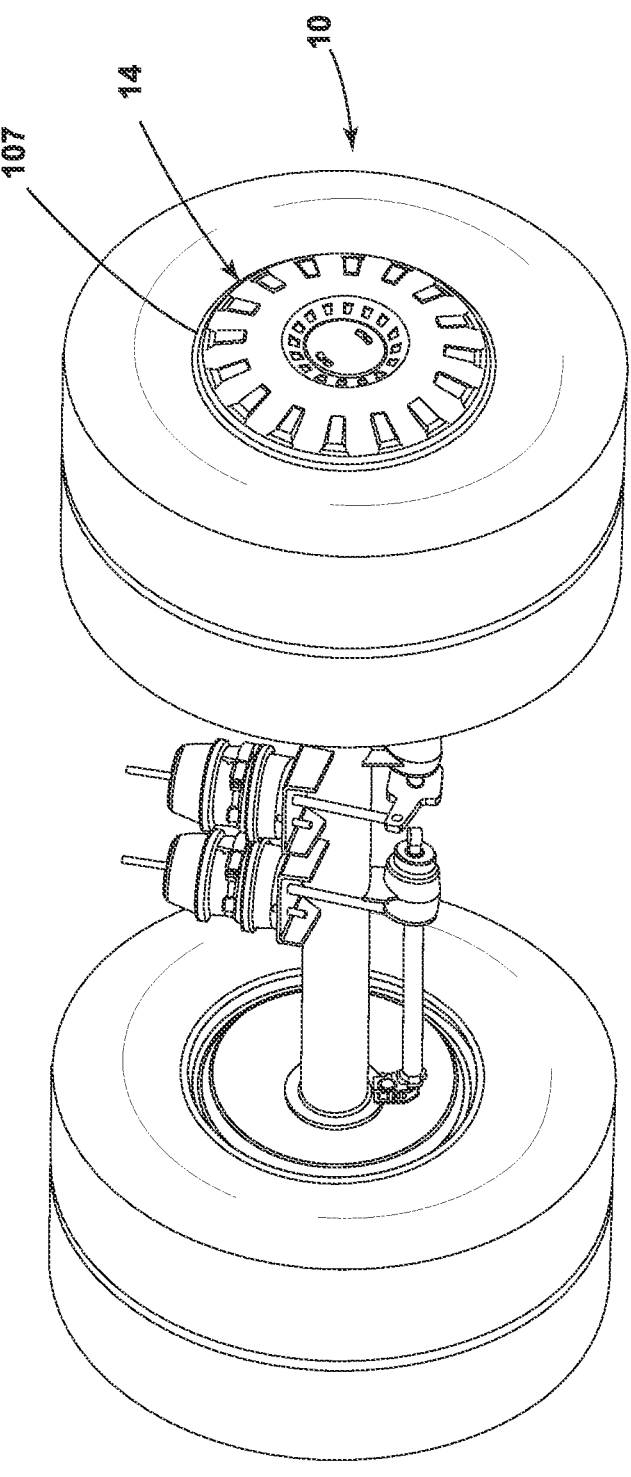
FIG. 15 is a perspective view of a vehicle dual wheel axle on which the wheel cover of the mounting assembly of FIG. 1 is mounted.
Figure 16:
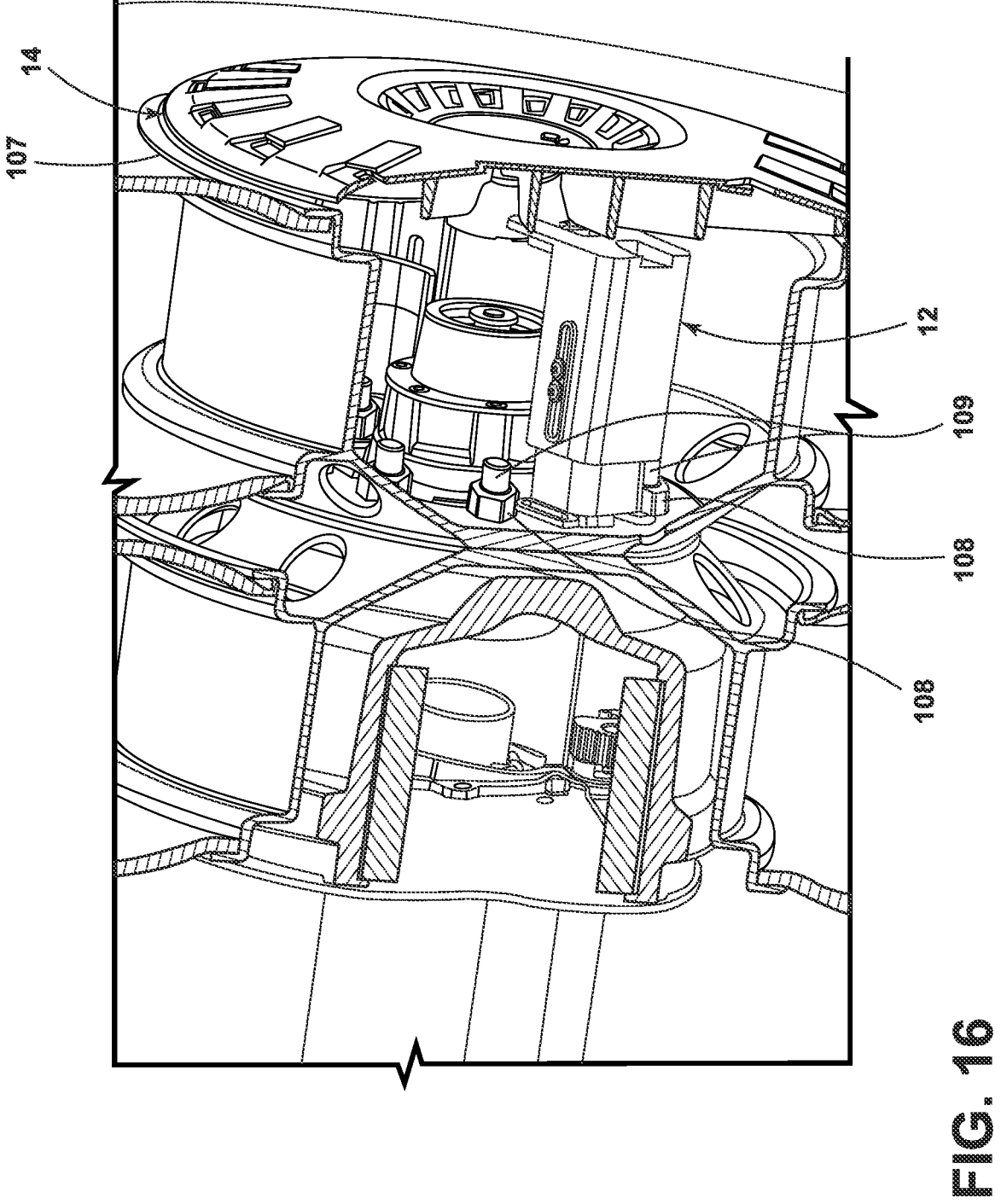
FIG. 16 is a partial sectional view of the dual wheel axle of FIG. 15 illustrating the mounting of the wheel cover with the mounting apparatus.
Figure 17:
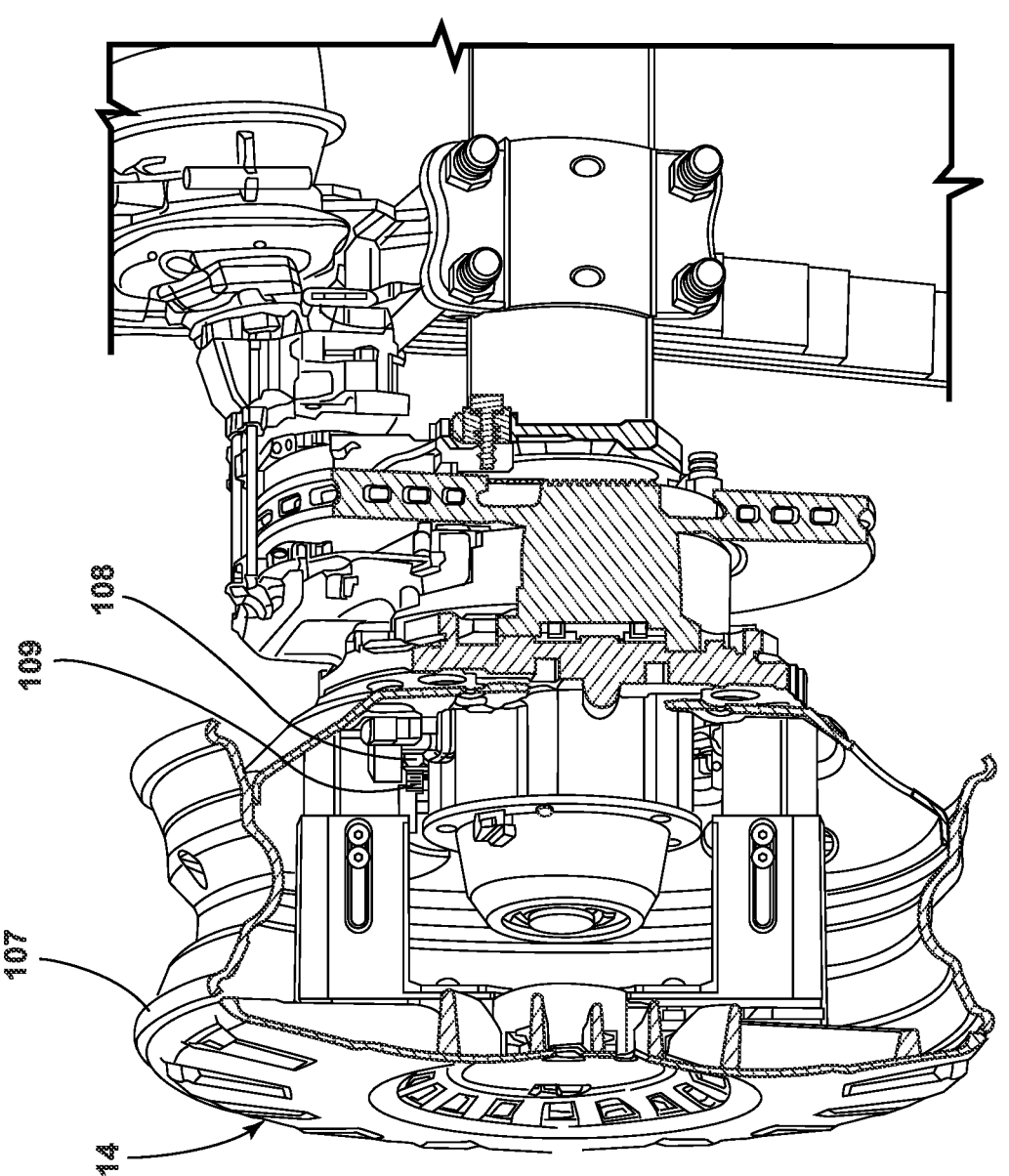
FIG. 17 is a partial sectional view of a vehicle single wheel axle on which the wheel cover of the mounting assembly of FIG. 1 is mounted with the mounting apparatus.

In some embodiments, a method of mounting the wheel cover 14 on a vehicle wheel 107 of a truck and trailer or other commercial vehicle includes adjusting the legs 28 of the mounting apparatus 12 in the radial direction to ensure proper fit of the mounting apparatus on the lug nuts 108 that secure the vehicle wheel to the axle hub having a plurality of circumferentially spaced lug studs 109. The vehicle wheel may be a non-steer wheel (i.e. a wheel that does not turn to steer the vehicle) and/or drive wheel (i.e. a wheel that transmits force from the vehicle powertrain to a driving surface). The axle may be on a dual wheel axle as shown in FIGS. 15 and 16 or a single wheel axle as shown in FIG. 17. As described above, loosening the nuts 52 that secure the bolts 48 in the bracket wing slots 26 allows the legs 28 to be slid along the brackets in the radial direction towards and away from the connector body 16. Thus, the width between the legs 28 of the mounting apparatus can be adjusted and set (by tightening the nuts 52) to match the distance between the two lug nuts (e.g. the diameter between two symmetrically opposed lug nuts on the wheel) on which the mounting apparatus is connected. Hence, the mounting apparatus 12 may be universally fit on a variety of sizes of wheels/wheel hubs having various lug stud circumferential spacing.

The method further includes adjusting the mounting apparatus 12 in the axial direction. Particularly, as described above, loosening the fasteners 56 on the inner member 30 of the leg 28 allows the inner member of the leg to move relative to the outer member 32 to extend or retract the leg. The length of the legs 28 can be set (by tightening the fasteners 56) so that when mounted on the wheel, the legs are long enough so that the connector body 16 of the mounting apparatus avoids and doesn't interfere with any component of the axle hub and/or any hub end systems that are part of, attached to, disposed on, or near the wheel hub, such as an ATIS, TPMS, and or hub odometer system. Also, the length of the legs 28 can be set so that when the cover 14 is mounted on the mounting apparatus 12, the cover is disposed at the outer edge of the wheel rim, i.e. so that the cover is not inside the wheel hub cavity or not spaced a significant distance away from the edge of the wheel rim, as shown in FIGS. 16 and 17.

Once the legs 28 are adjusted to obtain a proper fit in both the axial and radial directions, the feet 64 of the mounting apparatus 12 are connected to the vehicle wheel 107 by pressing the sockets 66 in the feet onto two of the wheel lug nuts 108. The exposed portions of the hub studs 109 that extend past the lug nuts 108 may be received through the openings 68 in the sockets 66, and the feet may be further secured to the vehicle wheel by jam nuts (not shown) that are threaded onto the exposed portions of the studs and tightened against the feet. It can be appreciated as well that once mounted, the axial direction of the mounting apparatus 12 corresponds to and is aligned with the axial direction of the wheel 107, and likewise the radial direction of the mounting apparatus corresponds to and is aligned with the radial direction of the wheel.

After the mounting apparatus 12 is properly installed on the vehicle wheel, the wheel cover 14 can be mounted onto the mounting apparatus as described above. Particularly, the wheel cover may be gripped and manipulated into a position in which the twist-lock slots 76 are aligned with the alignment tabs 72 on the connector body 16. Due to the construction of the wheel cover and mounting apparatus, it is visually apparent when the unlocking portion 78 of the twist-lock slots 76 are positioned over the alignment tabs 72. When the twist-lock slots and the alignment tabs are aligned, the pins 85 of the bayonet connector 84 are also aligned with the female receptors 89. The wheel cover 14 can then be pushed towards the mounting apparatus 12, allowing the alignment tabs 72 to move into the twist-lock slots 76, compressing the spring-loaded plunger 93, and causing the pins 85 to enter into the inlet 90 of the female receptor 89.

Figure 5:
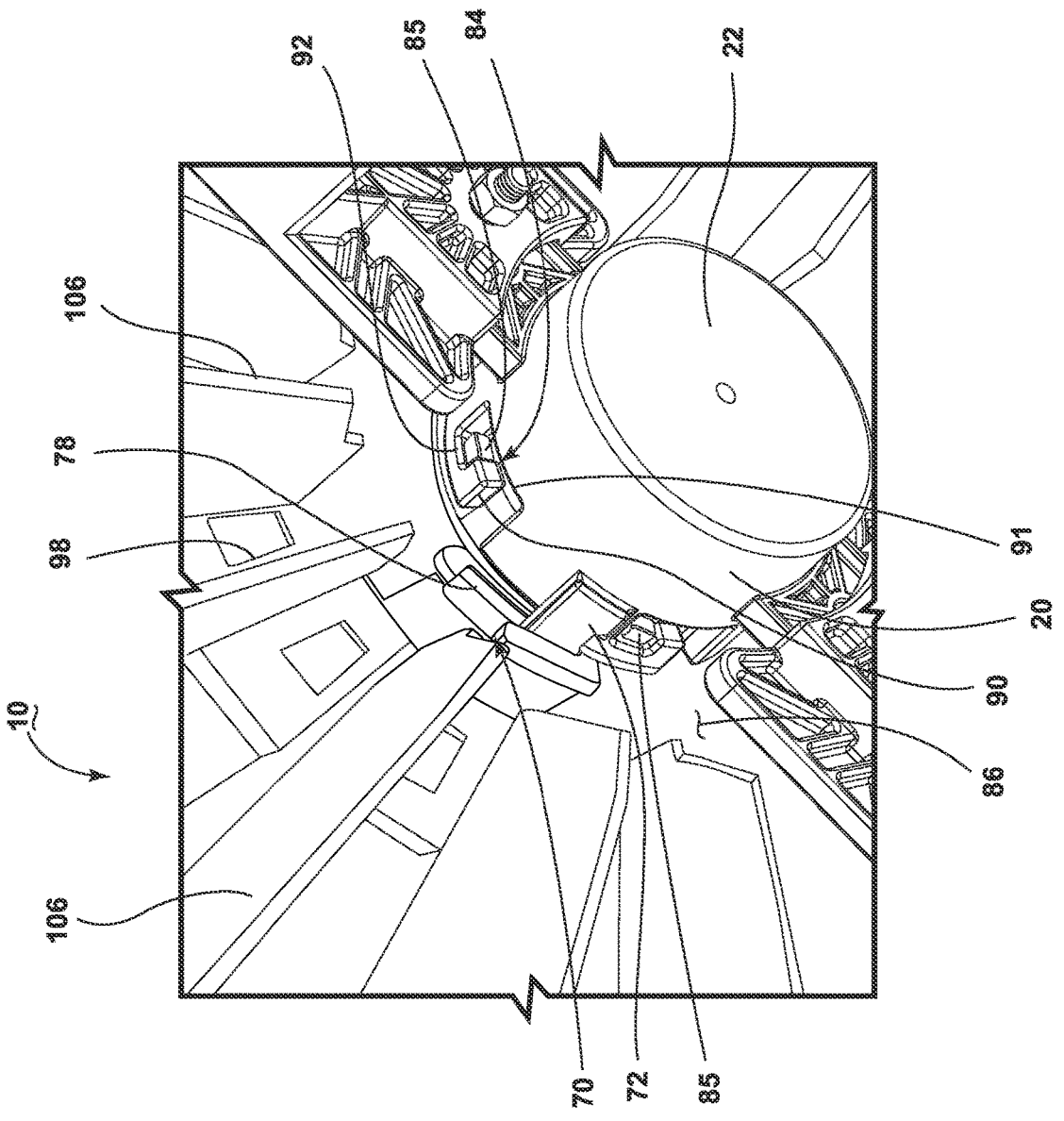
FIG. 5 is a partial rear perspective view of a twist-and-lock mechanism and bayonet connector of the assembly illustrating locking of the mechanism and connector in accordance with some embodiments of the disclosure.
Figure 6:
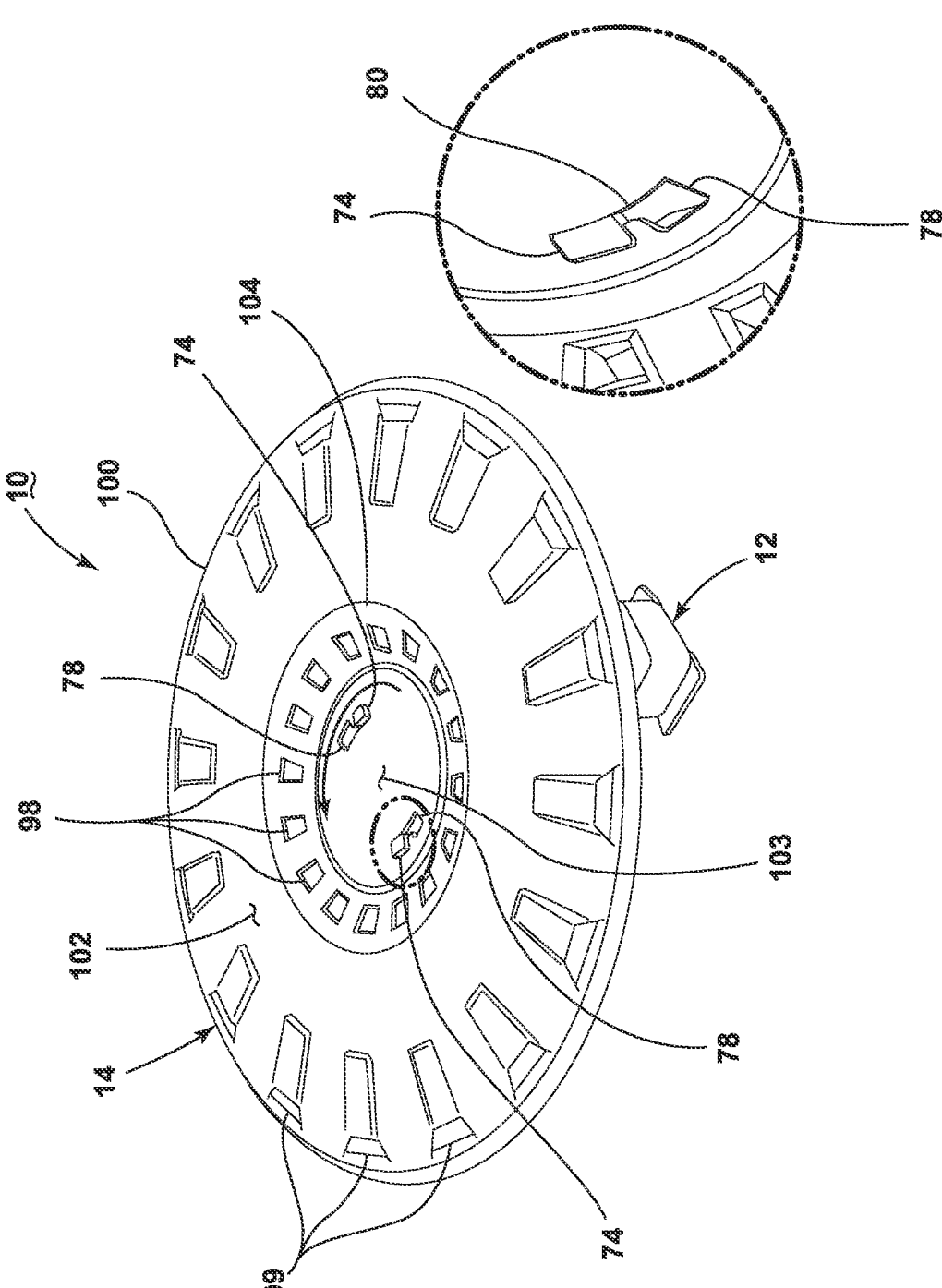
FIG. 6 is a front perspective view of the wheel cover mounting assembly of FIG. 1.
Figure 7:
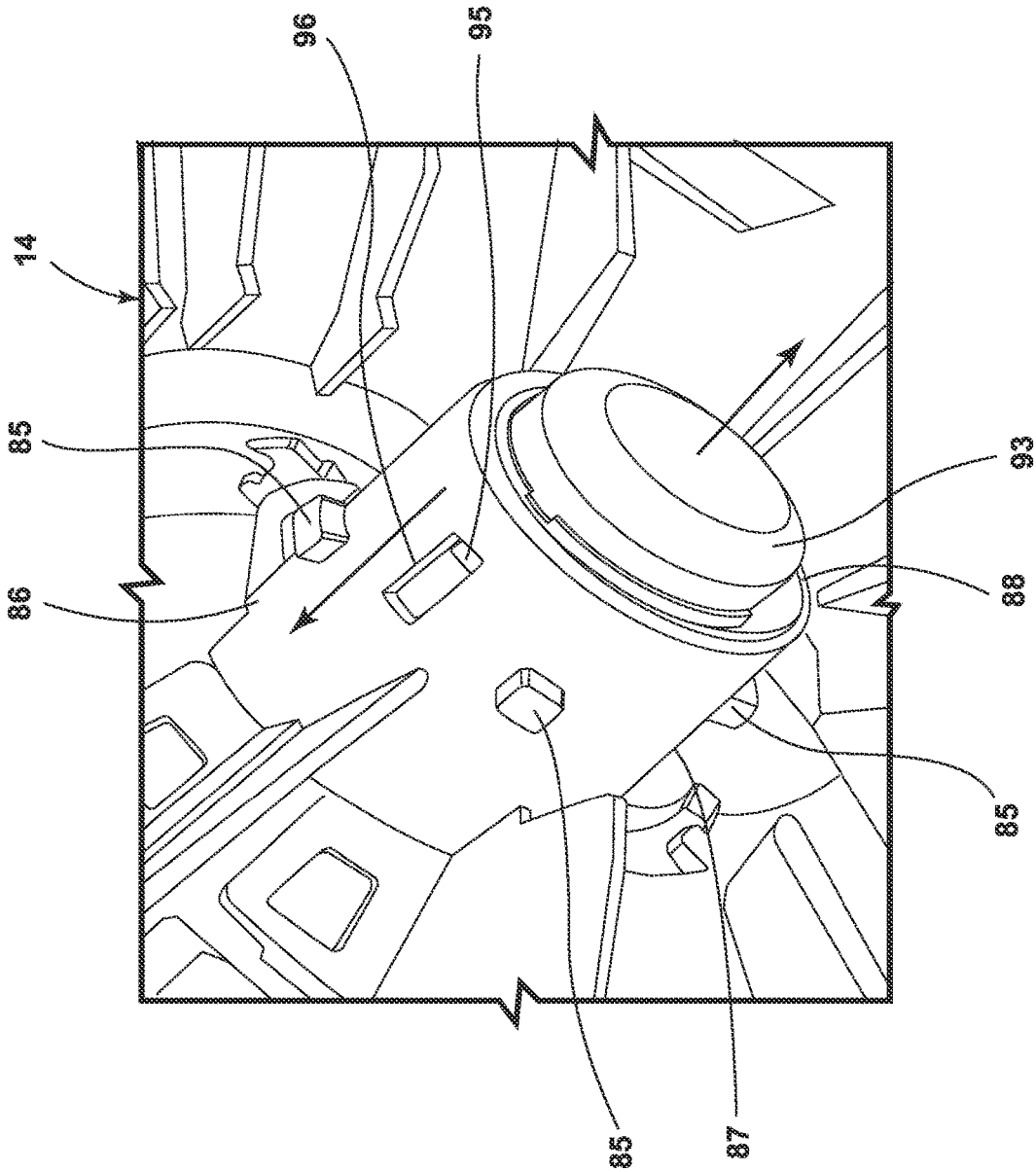
FIG. 7 is a partial rear perspective view of the wheel cover in accordance with some embodiments of the disclosure.

Once the pins 85 reach the end of the inlet 90 of the female receptor 89, the wheel cover 14 cannot be pushed any further towards the mounting apparatus 12. At this time, to lock the wheel cover 14 in place, the wheel cover is twisted so that the alignment tabs 72 move into the locking portion 80 of the twist-lock slots 76, and the pins 85 move to the docking portion 92 of the female receptor 89. Again, the movement of the alignment tabs 72 completely into the docking portion 92 of the twist-lock sots 76 provides a visual indication that the pins 85 of the bayonet connector 84 are in position to be locked. In this position, the pressing force can be released from the wheel cover 14, and the spring-loaded plunger 93 urges the wheel cover away from the mounting apparatus 12, causing the pins 85 to be urged and locked into the docking portions 92 of the female receptors 89 as shown in FIG. 5. In this position, the bent portions 74 of the alignment tabs 72 are also forcedly secured into the nests 82 of the twist-lock slots 76 as shown in FIG. 6. Nesting of the alignment tabs 72 in the twist-lock slots 76 prevents the wheel cover 14 from coming loose during use, and locking of the bayonet connector 84 prevents accidental or unintentional removal of the wheel cover as well as promoting rigidity of the wheel cover. When mounted in this manner, the wheel cover 14 covers the axial cavity of the wheel, thereby aiding in aerodynamic drag reduction and expulsion of stagnant air from the wheel end adjacent the hub.

Figures 8A, 8B, 8C, 8D:
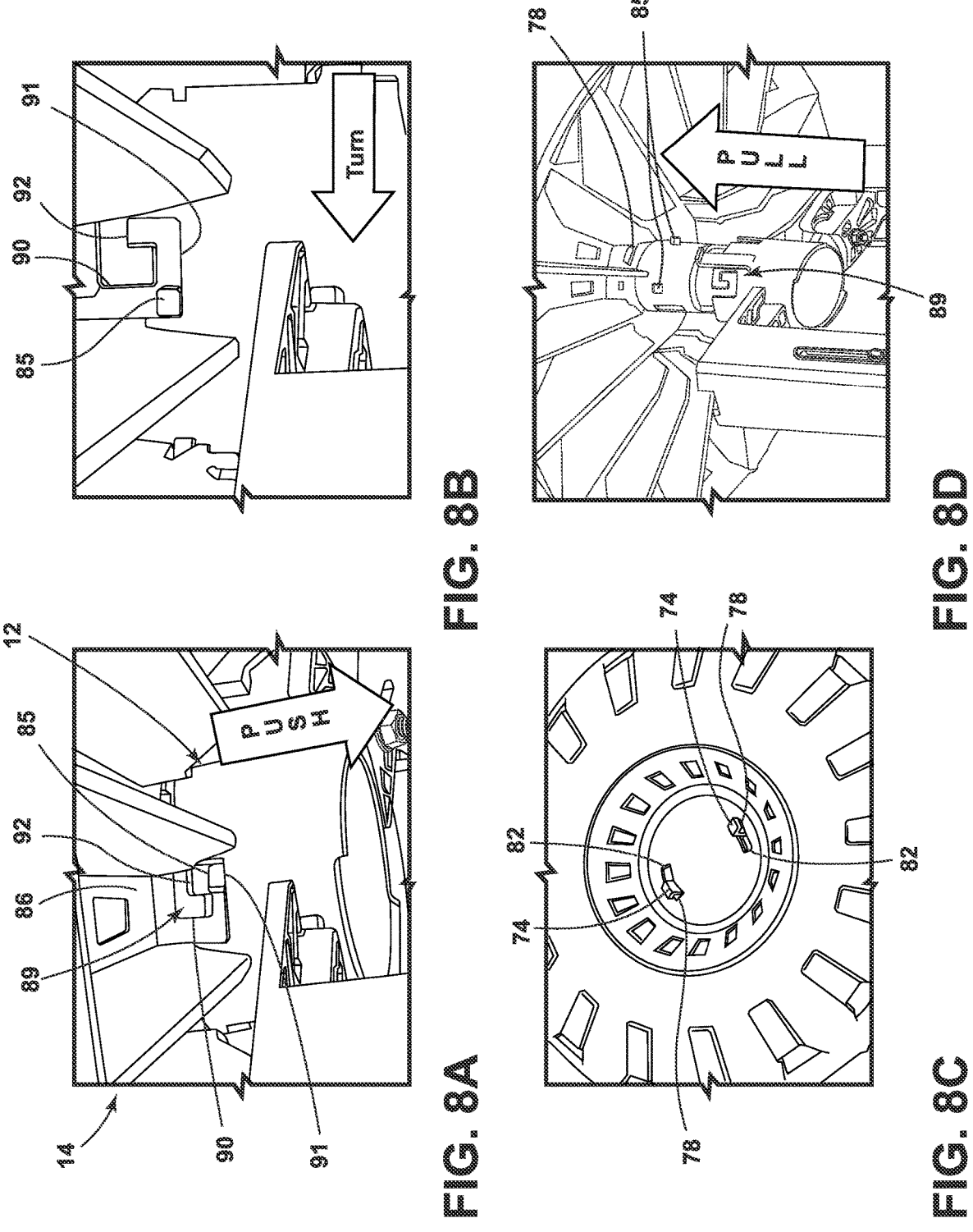
FIGS. 8A-D are partial perspective views of the mounting apparatus and wheel cover illustrating unlocking of the twist-and-lock mechanism and bayonet connector in accordance with some embodiments of the disclosure.
Figure 9:
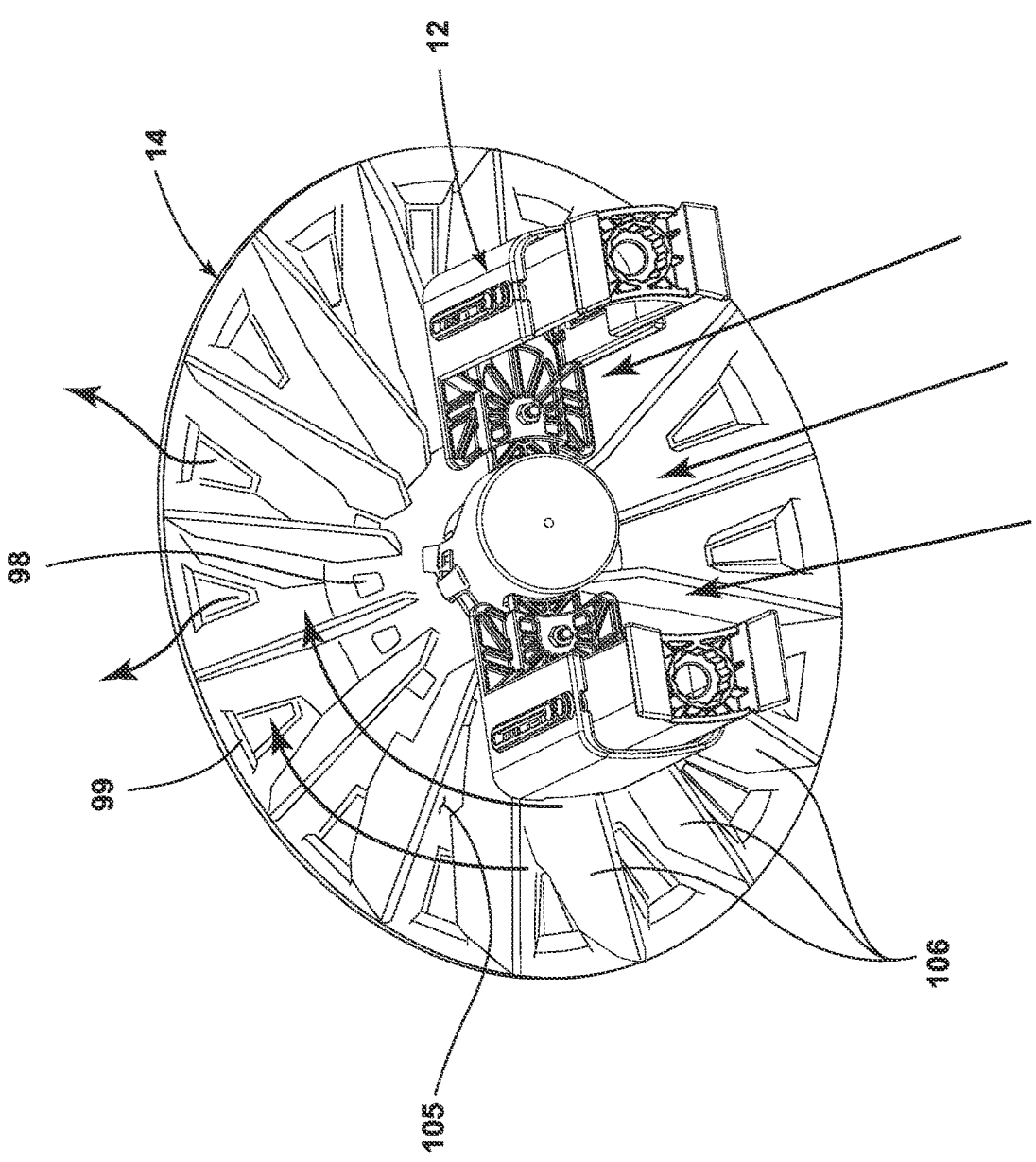
FIG. 9 is a rear perspective view of the wheel cover mounting assembly of FIG. 1 illustrating air flow from the back side of the wheel cover through exhaust ventilation openings in accordance with some embodiments of the disclosure.
Figure 10:
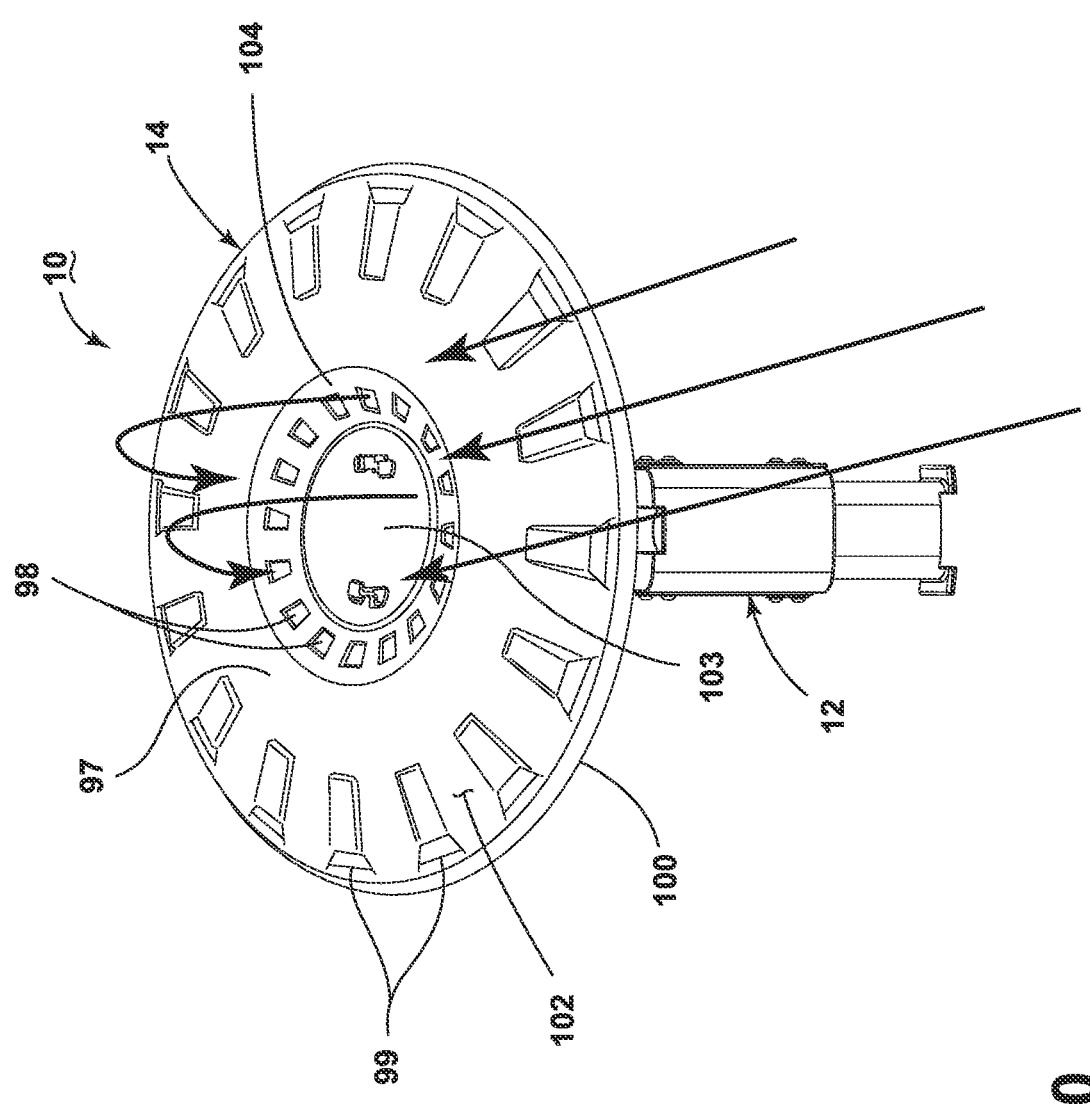
FIG. 10 is a front perspective view of the wheel cover mounting assembly of FIG. 1 illustrating air from the front side of the wheel cover through inlet ventilation openings in accordance with some embodiments of the disclosure.

To remove and/or change the wheel cover 14, the steps above are reversed. Specifically, the wheel cover 14 is pushed inward towards the mounting apparatus 12, disengaging the alignment tabs 72 from the nest 82, compressing the plunger 93, and moving the pins 85 to the end of the docking portion 92 of the female receptor 89 as shown in FIG. 8A. The wheel cover 14 is then twisted, moving the alignment tabs 72 to the unlocking portion 78 and moving the pins 85 through the intermediate channel 91 to the inlet 90 as shown in FIG. 8B. Simultaneously, the alignment tabs 72 are moved from the locking portion 80 to the unlocking portion 78 as shown in FIG. 8C. The wheel cover is then pulled away from the mounting apparatus 12, freeing the alignment tabs 72 from the twist-lock slots 76 and the pins 85 from the female receptors 89 as shown in FIG. 8D.

The various elements of the components of the wheel cover assembly 10 described above, e.g. the mounting apparatus 12 and the wheel cover 14, may be manufactured from, and thus ultimately comprise, the same or different material(s), such as any one or more of the materials described below. Moreover, each element may itself comprise a combination of different materials, and thus may not comprise a homogeneous composition throughout. In certain embodiments, one or more of the components or subcomponents of the wheel cover assembly 10 is monolithic in construction.

In general, materials suitable for use in or as the mounting apparatus 12 and the wheel cover 14 include metals (e.g. steels, aluminums, alloys, etc.), resins (e.g. thermoset and/or thermoplastic resins), rubbers/elastomers, and combinations thereof. However, myriad materials may be used to manufacture the elements of the wheel cover assembly 10, each typically selected as a function of availability, cost, performance/end use applications, etc. Moreover, metals, metal alloys, rubbers/elastomers, and resins are not exhaustive of suitable materials that may be used. In general, the resilient member 94 of the plunger 93 comprises a metal, such as a steel. However, the resilient member may comprise any number of materials suitable for providing the resilient member with deformable resiliency.

In certain embodiments, the components of the wheel cover assembly 10 comprise a resin, such as a thermoplastic and/or thermoset resin. In such embodiments, the components may each independently comprise an independently selected resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the various components of the wheel cover assembly 10 comprise material suitable for use under continuous exposure to temperatures of from −40° C. to 120° C., or from −40° C. to 135° C. and/or pressures of from 0.5 to 2 bar. In certain embodiments, one or more, alternatively all, of the various components of the wheel cover assembly # comprises materials that can withstand up to 30 minutes, alternatively more than 30 minutes, of exposure to temperatures of up to 150° C. without irreversible harmful effects (e.g. melting, etc.).

With regard to composition of the particular components of the wheel cover assembly 10 described above comprising a resin, examples of suitable resins include thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins (thermoplastic polyolefins (TPO)) such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

With regard to composition of the particular components of the wheel cover assembly 10 described above comprising a rubber/elastomer, examples of suitable rubber/elastomers include neoprene rubbers, buna-N rubbers, silicone rubbers, ethylene propylene diene monomer (EPDM) rubbers, natural gum rubbers, viton rubbers, natural latex rubbers, vinyl rubbers, santoprene rubbers, epichlorohydrin (ECH) rubbers, butyl rubbers, latex-free thermoplastic elastomer (TPEs), thermoplastic elastomers, hypalon rubbers, ethylene propylene rubbers, fluoroelastomer rubbers, fluorosilicone rubbers, hydrogenated nitrile rubbers, nitrile rubbers, perfluoroelastomer rubbers, polyacrylic rubbers, polychloroprenes, polyurethanes, aflas rubbers (e.g. TFE/Ps), chlorosulfonated polyethelene rubbers, styrene butadiene rubbers (SBRs), polyacrylates, ethylene acrylic rubbers, polyvinyl chloride (PVC), ethylene-vinyl acetate (EVA), and combinations thereof.

In various embodiments, any of the components of the wheel cover assembly 10 described above may comprise a material (e.g. a resin, rubber, etc.) including a filler. Examples of suitable fillers include reinforcing fillers added for providing mechanical strength, such as inorganic fillers (e.g. fumed silica fine powder, precipitated silica fine powder, fused silica fined powder, baked silica fine powder, fumed titanium dioxide fine powder, quartz fine powder, calcium carbonate fine powder, diatomaceous earth fine powder, aluminum oxide fine powder, aluminum hydroxide powder, zinc oxide fine powder, zinc carbonate fine powder, glass fibers, etc.), organic fibers (e.g. carbon fibers), natural fibers, and the like, as well as combinations thereof. In some embodiments, at least one component of the wheel cover assembly # comprises a fiberglass.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A wheel cover assembly for a vehicle wheel, the assembly comprising:

a mounting apparatus adapted for mounting on lug nuts of a vehicle wheel, the mounting apparatus including a connector body and being adjustable in both axial and radial directions;

a wheel cover releasably connected to the mounting apparatus; and dual quick release connections that releasably connect the wheel cover to the mounting apparatus, the dual quick release connections including a first quick release connection and a second quick release connection;

wherein the first quick release connection includes:

at least one alignment tab extending from the connector body, each alignment tab including an axially extending body that terminates in a bent end that extends at an angle to the axially extending body of the alignment tab; and at least one arcuate-shaped twist-lock slot in the wheel cover, each twist-lock slot including an unlocking portion and an adjacent locking portion, the alignment tab fitting through the unlocking portion but not being passable through the locking portion, and the locking portion including a nest that receives and holds the alignment tab, the nest being defined by a surface that is sized to receive the bent end of the alignment tab;

wherein each alignment tab is receivable in one of the twist-lock slots, the bent end of each alignment tab contacts the surface of the nest when positioned in the locking portion of the twist-lock slot, and twisting of the wheel cover locks and unlocks the alignment tab in the twist-lock slot;

wherein the second quick release connection includes:

a bayonet connector that releasably connects the mounting apparatus to the wheel cover, wherein:

the bayonet connector includes at least one radially extending pin disposed on a back side surface of the wheel cover, at least one female receptor disposed on the connector body of the mounting apparatus, each female receptor receiving one of the radially extending pins, and a spring-loaded plunger urging the wheel cover away from the connector body when the wheel cover is connected to the mounting apparatus, the plunger thereby releasably securing the at least one pin in the at least one female receptor, and each female receptor has a spiral-like shape including an inlet running in the axial direction, an intermediate channel connected to and generally perpendicular to the inlet, and a docking portion connected to and generally parallel to the inlet, the pin being held in the docking portion in a locked orientation.

2. The wheel cover assembly of claim 1, wherein the mounting apparatus includes:

a pair of bracket wings extending in opposite directions from the connector body;

a pair of legs adjustably connected to the pair of brackets, the legs being moveable along the brackets in the radial direction to vary a distance between the legs;

each leg including telescoping members for adjusting a length of the legs in the axial direction; and a foot disposed at an end of each leg, each foot being mateable with the lug nuts of the vehicle wheel.

3. The wheel cover assembly of claim 2, wherein each bracket includes an elongated slot, and a fastener is disposed in the slot for releasably fixing the position of the leg in the bracket.

4. The wheel cover assembly of claim 2, wherein the telescoping members of each leg include an inner member and an outer member, the inner member being linearly adjustable relative to the outer member.

5. The wheel cover assembly of claim 4, wherein the outer member includes a longitudinal slot, and at least one fastener is disposed in the slot for releasably fixing the position of the inner member relative to the outer member.

6. The wheel cover assembly of claim 2, wherein each foot includes a socket co-operable with one of the lug nuts for connecting the mounting apparatus to the vehicle wheel.

7. The wheel cover assembly of claim 1, wherein the vehicle wheel is one or more of a non-steer wheel and a drive wheel.

8. A method of mounting a wheel cover on a vehicle wheel, the method comprising:

providing the wheel cover assembly of claim 1;

adjusting the mounting apparatus in the radial direction to ensure proper fit of the mounting apparatus on the lug nuts securing the vehicle wheel to an axle hub of the vehicle;

adjusting the mounting apparatus in the axial direction to avoid any components attached to or part of the axle hub; and releasably connecting the wheel cover to the mounting apparatus to cover an axial cavity of the wheel, thereby aiding in aerodynamic drag reduction and expulsion of stagnant air from the wheel end adjacent the hub.

9. A wheel cover assembly for a vehicle wheel, the wheel cover assembly comprising:

a mounting apparatus adapted for mounting on lug nuts of a vehicle wheel, the mounting apparatus including a connector body and being adjustable in both axial and radial directions;

a wheel cover releasably connected to the mounting apparatus; and dual quick release connections that releasably connect the wheel cover to the mounting apparatus, the dual quick release connections including a first quick release connection and a second quick release connection;

wherein the first quick release connection includes:

at least one alignment tab extending from the connector body, each alignment tab including an axially extending body that terminates in a bent end that extends at an angle to the axially extending body of the alignment tab; and at least one arcuate-shaped twist-lock slot in the wheel cover, each twist-lock slot including an unlocking portion and an adjacent locking portion, the alignment tab fitting through the unlocking portion but not being passable through the locking portion, and the locking portion including a nest that receives and holds the alignment tab, the nest being defined by a surface that is sized to receive the bent end of the alignment tab;

wherein each alignment tab is receivable in one of the twist-lock slots, the bent end of each alignment tab contacts the surface of the nest when positioned in the locking portion of the twist-lock slot, and twisting of the wheel cover locks and unlocks the alignment tab in the twist-lock slot;

wherein the second quick release connection includes:

a bayonet connector that releasably connects the mounting apparatus to the wheel cover, wherein:

the bayonet connector includes at least one radially extending pin disposed on a back side surface of the wheel cover, at least one female receptor disposed on the connector body of the mounting apparatus, each female receptor receiving one of the radially extending pins, and a spring-loaded plunger urging the wheel cover away from the connector body when the wheel cover is connected to the mounting apparatus, the plunger thereby releasably securing the at least one pin in the at least one female receptor, and each female receptor has a spiral-like shape including an inlet running in the axial direction, an intermediate channel connected to and generally perpendicular to the inlet, and a docking portion connected to and generally parallel to the inlet, the pin being held in the docking portion in a locked orientation;

wherein the wheel cover includes a plurality of inlet and exhaust openings, the exhaust openings being circumferentially spaced along an outer edge of the wheel cover, and the inlet openings being concentric with the exhaust openings and disposed closer to a center of the wheel cover than the exhaust openings;

wherein the exhaust openings define a first ring of openings, the inlet openings define a second ring of openings circumferentially disposed around a center of the wheel cover, and the first and second rings are concentric rings that are spaced from each other and spaced from the center of the cover;

wherein the plurality of exhaust openings and the plurality of inlet openings are formed in an outer face surface of the wheel cover; and a plurality of fan blades are formed on a rear surface of the wheel cover and extend radially between the inlet and exhaust openings.

10. The wheel cover assembly of claim 9, wherein an outer surface of the wheel cover includes a convex ring adjacent the outer edge, and a recessed center portion within the convex ring, the plurality of inlet openings being disposed along a peripheral edge of the recessed center portion.

11. The wheel cover assembly of claim 9, wherein the wheel cover includes a concave inner surface, and a plurality of radially extending fan blades disposed on the concave inner surface.

12. The wheel cover assembly of claim 11, wherein the fan blades form a centrifugal radial fan that draws air through the ventilation openings.

\* \* \* \* \*